United States Patent [19]

Irwin

[11] Patent Number: 4,496,811
[45] Date of Patent: Jan. 29, 1985

[54] FOOT SWITCH SAFETY ENCLOSURE

[76] Inventor: Lawrence F. Irwin, 12860 San Fernando Rd., Sylmar, Calif. 91342

[21] Appl. No.: 485,263

[22] Filed: Apr. 15, 1983

[51] Int. Cl.³ .............................................. H01H 3/14
[52] U.S. Cl. .............................. 200/86.5; 200/153 SC
[58] Field of Search ................... 200/86.5, 61.7, 86 R, 200/86 A, 153 C, 61.93, 61.89, 333, 334, 304, 42 R, 42 A, 42 T; 340/304, 693; 220/242

[56] References Cited

U.S. PATENT DOCUMENTS

| 1,872,618 | 8/1932 | Butte | 200/86.5 |
| 2,141,936 | 12/1938 | Schmitt | 200/304 |
| 3,180,962 | 4/1965 | Driscoll | 200/302.2 |
| 4,036,396 | 7/1977 | Kennedy et al. | 220/242 |

FOREIGN PATENT DOCUMENTS 2804315  8/1978  Fed. Rep. of Germany ..... 200/86.5

Primary Examiner—A. D. Pellinen
Assistant Examiner—Morris Ginsburg
Attorney, Agent, or Firm—James E. Brunton

[57] ABSTRACT

A safety enclosure for enclosing a foot operated switch so as to prevent accidental actuation of the switch. The enclosure is open at the top and includes upstanding walls within which the switch is mounted. One of the walls is pivotally movable by a positive act of the operator against the urging of a closure spring from an upstanding position to a lowered position to enable the operator to bring his foot into pressural operating engagement with the switch.

6 Claims, 7 Drawing Figures

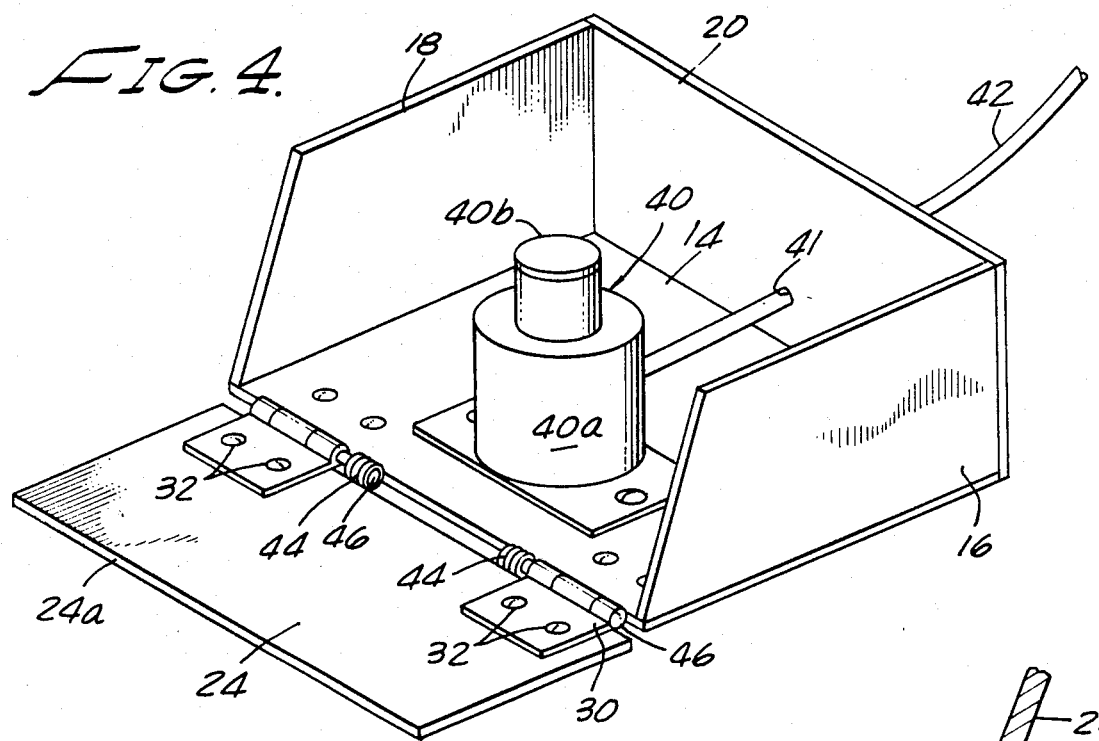
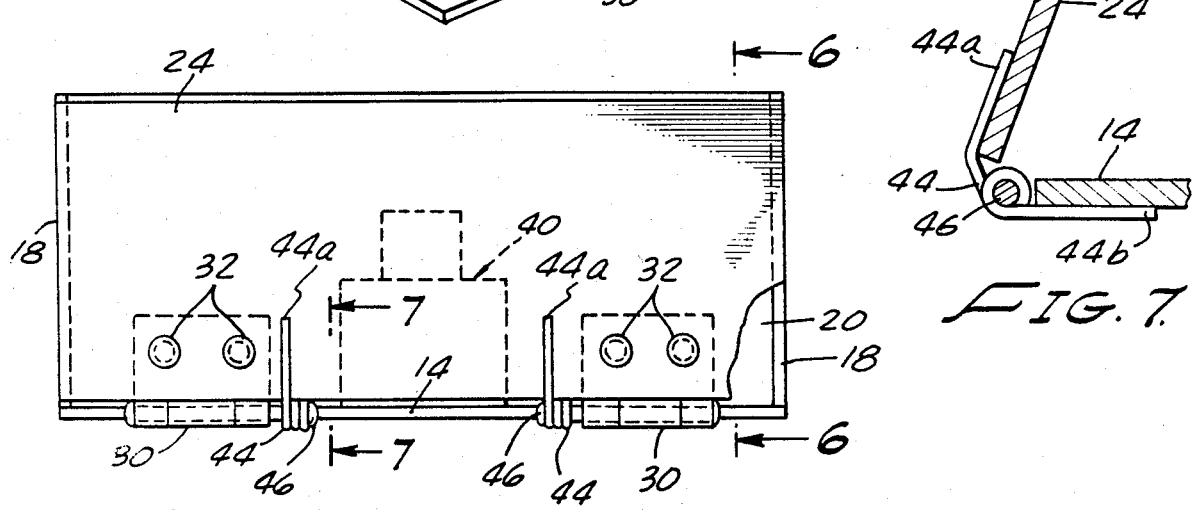
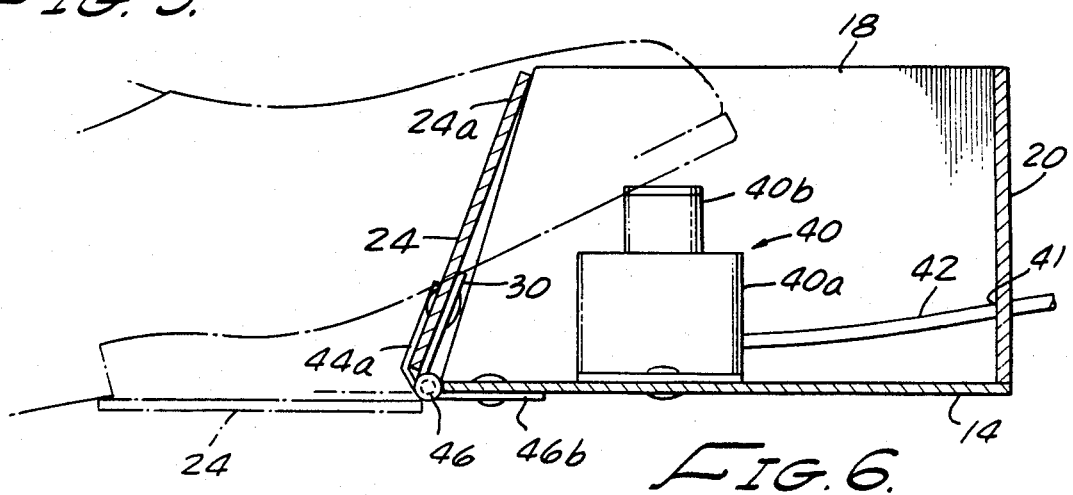

FOOT SWITCH SAFETY ENCLOSURE

BACKGROUND OF THE INVENTION

1. Field of the Invention

The present invention relates generally to safety devices for preventing inadvertent actuation of a switch. More particularly the invention concerns a novel safety enclosure for enclosing a foot operated switch of the mechanical, electrical or pneumatic actuated type.

2. Discussion of the Prior Art

Many types of machinery are operated by switches adapted to be actuated by the foot of the machine operator. Such systems are advantageous in that they permit free use of both hands of the operator at the time the machine is started.

While various types of foot operated switches are commonly used, mechanical or pneumatically actuated switches are the most popular. Mechanically actuated foot switches are typically either of the plunger or push button type, or the tumbler type. Pneumatically actuated foot switches usually comprise a deformable pneumatic bulb, or air cushion, which is deformed by the foot of the user to operate a remotely located switch mechanism.

Regardless of the particular type of foot operated switch involved, it presents a substantial hazard unless some type of protective device is used to prevent inadvertent actuation of the switch by the operator or by a passerby. If the switch is simply left exposed on the floor of the operational area, the operator or a passerby can accidentally step on the switch causing the machine which it controls to unexpectedly start. If this happens, the operator, or others in the area of the machine, can be seriously injured.

In the past, foot operated switches have typically been mounted in heavy metal enclosures which are open at the front but are designed to cover the top of the switch so that it cannot accidentally be stepped on. To operate the switch, the operator must first stick his foot into the interior of the enclosure between the top inner wall thereof and the switch. The operator must then exert downward pressure on the switch to operate it. This is extremely cumbersome and awkward. Further, because of its bulk, the housing itself frequently forms a substantial hazard in that it may easily be kicked or tripped over by the operator or by a passerby. Also such housings are generally quite costly to manufacture.

The protective device of the present invention overcomes the drawbacks of the prior art devices in that it is light weight, easily operated, economical and yet totally effective in preventing accidental actuation of the various types of foot switches commonly in use.

The unique advantages of the device of the present invention will become readily apparent from the discussion which follows.

SUMMARY OF THE INVENTION

It is an object of the present invention to provide a safety enclosure for a foot operated switch which positively prevents accidental actuation of the switch and yet is easy to operate and safe to use even in crowded manufacturing areas. The device is uniquely constructed so that any accidental striking or stepping on the device from any angle, top or sides, will not accidentally activate the foot switch housed threwithin.

It is another object of the invention to provide a safety enclosure of the aforementioned character which can readily accommodate the various types of pneumatic and mechanical switches commonly in use.

It is a further object of the invention to provide a safety enclosure of the character described which is open at the top so that access to the switch can be gained by merely exerting a positive rearward and downward pressure on a hingedly mounted forward wall which is normally biased into a closed upstanding orientation.

It is another object of the invention to provide a safety enclosure of the class described in the preceding paragraphs which is small and lightweight and which itself does not present a hazard to operators or passersby.

It is still another object of the invention to provide a safety enclosure as heretofore described which can readily be operated by feel without the operator having to look at the enclosure.

A further object of the invention is to provide a safety enclosure which is simple and inexpensive to manufacture, is rugged and reliable in use and one which can be provided to end users at very low cost.

BRIEF DESCRIPTION OF THE DRAWINGS

FIG. 4 is a generally perspective view of an alternate form of the apparatus of the invention showing a mechanical, rather than pneumatically, operated switch mounted within the safety enclosure.

FIG. 5 is a front elevational view of the apparatus of FIG. 4, partly broken away to show internal construction.

FIG. 6 is a cross-sectional view taken along lines 6—6 of FIG. 5.

FIG. 7 is an enlarged cross-sectional view taken along lines 7—7 of FIG. 5.

DESCRIPTION OF THE INVENTION

Figure 1:
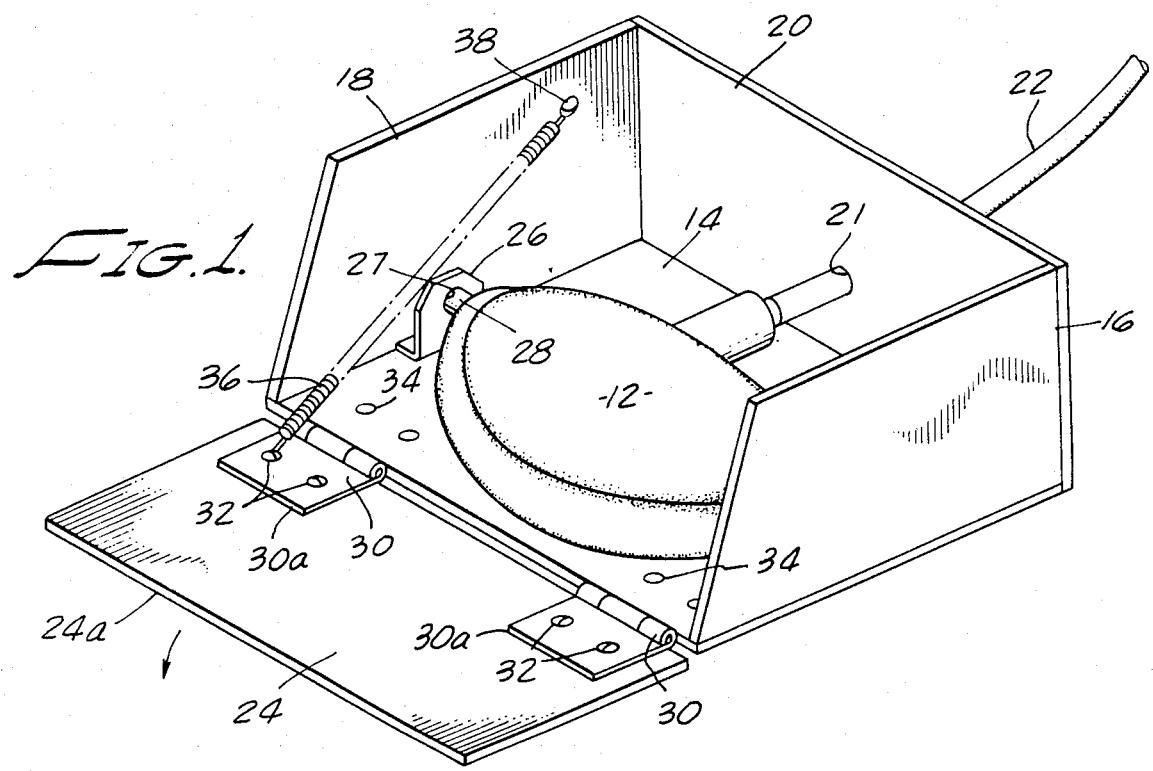
FIG. 1 is a generally perspective view of the apparatus of the invention showing the forward access door in an open position to receive the foot of the operator.
Figure 2:
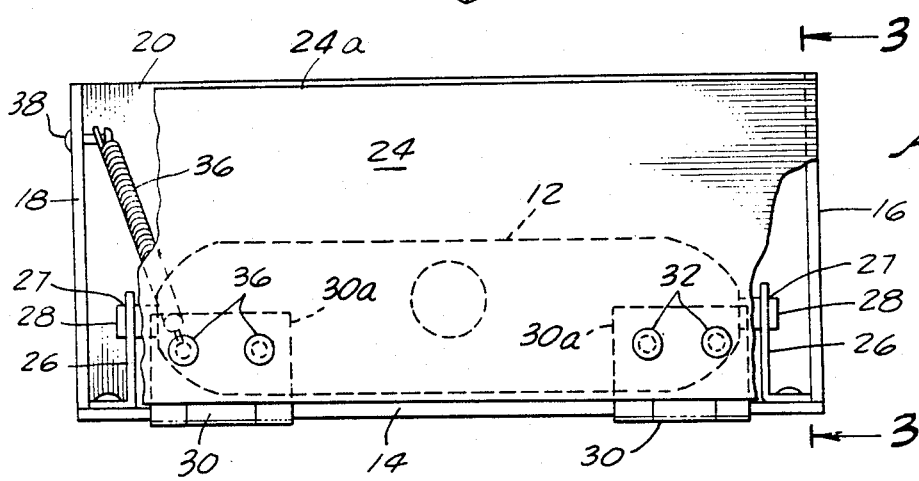
FIG. 2 is a front elevational view of the apparatus partly broken away to show internal construction.
Figure 3:
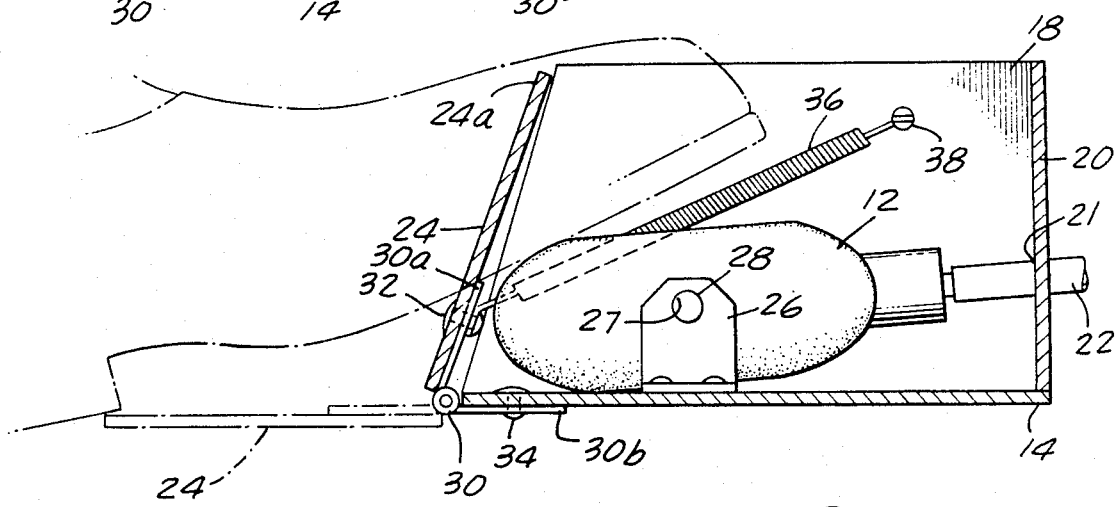
FIG. 3 is a side elevational view taken along lines 3—3 of FIG. 2.

Referring to FIGS. 1 through 3, one form of the Foot Switch Safety Enclosure of the invention is there illustrated. In this form of the invention, a pneumatically operated foot switch of common construction is shown mounted internally of the enclosure housing of the invention.

As best seen in FIG. 1, the housing of this form of the invention for partially enclosing the pneumatic switch 12 comprises base member 14 adapted to support the switch 12, a pair of generally vertically extending side walls 16 and 18 connected along the lower edges thereof to base member 14, and a generally vertically extending rear wall 20 interconnected to side walls 16 and 18 along their rear sides and connected to base member 14 along the bottom side of the wall. In the present form of the invention, rear wall 20 is apertured at 21 so that a conduit 22, which interconnects the pneumatic bulb of switch 12 with the remotely located switch mechanism, can pass through the rear wall 20.

A front wall 24 is hingedly connected to base member 14 for movement from a first normally upwardly extending position (as shown in FIG. 3) to a second non-vertical position (as shown in FIG. 1 and in the phantom lines in FIG. 3) in response to downward forces exerted on the upper edge 24a of wall 24.

Referring to FIGS. 1 and 2, the pneumatic bulb portion of the switch 12 is held in position within the safety enclosure by means of transversely spaced apart "L" shaped brackets 26 which are affixed at their lower leg portions to base member 14. The upper leg portions of brackets 26 are apertured at 27 to receive transversely outwardly extending bosses 28 which form a part of switch 12. The details of construction and operation of switch 12 will not be discussed herein since this swtich forms no part of the present invention and is readily commercially available.

Front wall 24 is hingedly connected to base member 14 by a pair of transversely spaced apart leafed hinges 30 of standard construction. As best seen by referring to FIGS. 1 and 3, the forward leaf portion 30a of hinges 30 are affixed to the inner side of front wall 24 by fasteners 32. The cooperating leaf portions 30b of hinges 30 are affixed to the underside of base member 14 by means of appropriate fasteners 34.

In the form of the invention shown in FIGS. 1 through 3, biasing means are provided for yieldably resisting movement of the front wall 24 from the first upwardly extending position to the second downwardly substantially horizontally extending position. In the embodiment of the invention here illustrated the biasing means is provided in the form of an elongated coil spring 36, one end of which is affixed to front wall 24 by fasteners 32 and the other end of which is affixed to the upper rearward portion of side wall 18 by means of a fastener 38. While only one elongated spring 36 is shown in the drawings, for some applications it is desirable to use a second elongated coil spring similarly mounted on the opposite side of the enclosure.

Turning now to FIGS. 4, 5 and 6, another embodiment of the Foot Switch Safety Enclosure of the invention is shown. This form of the invention is similar to the form of the invention shown in FIGS 1 through 3, and like numerals are used to identify like component parts. In the form of the invention shown in these Figures, however, the pneumatic switch 12 is replaced by a mechanical switch 40 having a base portion 40a affixed to base member 14 and a spring loaded plunger portion 40b which is carried by base portion 40a and is adapted to be engaged by the foot of the operator to activate the switch. In this embodiment of the invention, rear wall 20 is apertured at 41 to allow for passage of an electric cord 42 which interconnects the foot switch with the device controlled by the switch.

In this alternate form of the invention shown in the drawings, the biasing means comprises a pair of torsion springs 44 carried by hinge pins 46 of hinges 30. As best seen by referring to FIG. 7, torsion spring 44 has one leg 44a maintained in engagement with the outer surface of forward wall 24 and a second leg 44b maintained in engagement with base member 14. With this arrangement, movement of forward wall 24 from a first upwardly extending position as shown by the solid lines in FIG. 6 to a second substantially horizontal position as shown by the phantom lines of FIG. 6, is yieldably resisted by the biasing means or torsion springs 44.

In both embodiments of the Foot Switch Safety Enclosure of the invention, the front, rear and side walls of the housing enclosure normally extend above the uppermost portion of the switch, being it a pneumatic switch 12, as illustrated in FIG. 1, or a mechanical switch 40, as illustrated in FIG. 4. The side walls can be constructed of metal, plastic or other rigid and durable materials.

When the biasing means is at rest, front wall 24 is continuously urged into the upwardly closed position shown by the solid lines in FIGS. 3 and 6. With the forward wall in the upwardly extending position, if the operator accidentally steps upon the safety enclosure, his foot will be restrained from coming in contact with the switch, and accordingly the switch will not be actuated. If, however, the operator desires to actuate the switch, he may do so by consciously and intentionally exerting a rearward and downward pressure upon forward wall 24 with either his right or left foot. This exertion of such a pressure on forward wall 24 will cause the wall to move in the direction of the arrow of FIG. 1 against the urging of the biasing means from the first upwardly extending position to the second downwardly substantially horizontally extending position shown in FIGS. 3 and 6. When the forward wall is in the second position, the operator may bring his foot into pressural contact with the switch so as to activate the switch, thereby starting or stopping the device controlled by the switch.

In the embodiment of the invention shown in FIGS. 1 through 3, the operator simply applies pressure to the pneumatic bulb of the switch 12 in order to actuate the switch. In the embodiment of the invention shown in FIGS. 4 through 7, the operator exerts a downward pressure on plunger 40b of switch 40 causing an electrical contact to be closed, thereby energizing the device controlled by the switch 40.

Because the safety enclosure of the invention is compact and light-weight, even if the foot of the operator or a passerby accidentally strikes the enclosure, no damage will be done to the switch nor will the operator be injured. Similarly, if the operator accidentally steps on the enclosure the switch will not be activated. To move the front wall into a downward position so that the foot can be brought into engagement with the switch mounted within the safety enclosure a conscious, intentional backward and downward manipulation of front wall 24 of the enclosure is necessary to overcome the urging of the biasing means. When foot pressure is released and the foot removed from the position shown in FIGS. 3 and 6, the wall 24 springs back into the position shown in FIG. 7. Accordingly, this switch enclosure now positively prevents accidental actuation of the switch and provides a simple, inexpensive and safe means for preventing injury.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. A foot operated safety enclosure in combination with a foot operated switch comprising:
(a) a housing for partially enclosing the switch including:
   (1) a base member for supporting the switch; and
   (2) generally upstanding front, rear and side walls connected to said base, said walls extending above the uppermost part of the switch with one of said walls being inwardly sloping and pivotally movable relative to said base member for movement by the foot of the user from a first normally upstanding position to a second lowered position in response to a rearward and downward force being exerted on the upper edge thereof whereby as said pivotally movable wall is moved into said second lowered position the foot of the user will move downwardly into operable engagement with the switch; and (b) biasing means for yieldably resisting movement of said one of said walls from said first to said second position.

2. A safety enclosure as defined in claim 1 in which said inwardly sloping wall is hingedly connected to said base member.

3. A safety enclosure as defined in claim 2 in which said biasing means comprises an elongated coil spring one end of which is connected to said inwardly sloping wall and the other end of which is connected to a side wall.

4. A safety enclosure as defined in claim 2 in which said biasing means comprises a torsion spring mounted on said housing and so constructed and arranged that movement of said inwardly sloping wall from said first position toward said second position will impart torsional forces on said spring.

5. A safety enclosure in combination with a foot operated air actuated switch comprising:

(a) a housing for partially enclosing the switch comprising:
  (1) a base member for supporting the switch;
  (2) a pair of generally vertically extending side walls connected to said base member;
  (3) a generally vertical extending rear wall interconnected to said side walls and to said base member;
  (4) an inwardly sloping front wall hingedly connected to said base member for pivotal movement from a first normally upwardly extending position to a second lowered position in response to forces exerted by the foot of the user rearwardly and downwardly on the upper edge of said front wall, said front, rear and side walls of said housing normally extending above the uppermost portion of the switch whereby as said pivotally movable wall is moved into said second lowered position the foot of the user will move downwardly into operable engagement with the switch; and (b) biasing means for yieldably resisting movement of said front wall from said first to said second position.

6. A safety enclosure as defined in claim 5 in which said side walls include inwardly sloping forward edges adapted to engage said front wall when said front wall is in said first position.

* * * * *